(12) United States Patent
Bozoukov

(10) Patent No.: US 12,442,564 B1
(45) Date of Patent: Oct. 14, 2025

(54) TORQUE TUBE FOR A RENEWABLE ENERGY SYSTEM

(71) Applicant: FORUM US, INC., Houston, TX (US)

(72) Inventor: Ivaylo Bozoukov, Katy, TX (US)

(73) Assignee: FORUM US, INC., Houston, TX (US)

( * ) Notice: Subject to any disclaimer, the term of this patent is extended or adjusted under 35 U.S.C. 154(b) by 0 days.

(21) Appl. No.: 18/746,266

(22) Filed: Jun. 18, 2024

(51) Int. Cl.
*F24S 30/425* (2018.01)
*H02S 20/32* (2014.01)
*F24S 30/00* (2018.01)

(52) U.S. Cl.
CPC ............ *F24S 30/425* (2018.05); *H02S 20/32* (2014.12); *F24S 2030/136* (2018.05); *F24S 2030/15* (2018.05)

(58) Field of Classification Search
CPC .......... H02S 30/10; H02S 20/30; H02S 20/32; F24S 2030/15; F24S 2030/136; F24S 30/425
See application file for complete search history.

(56) References Cited

U.S. PATENT DOCUMENTS

| | | | |
|---|---|---|---|
| 7,647,924 B2 * | 1/2010 | Hayden | F24S 25/10 |
| | | | 40/607.01 |
| 8,459,249 B2 | 6/2013 | Corio | |
| 9,482,449 B2 | 11/2016 | Cole et al. | |
| 10,320,326 B2 * | 6/2019 | Schimelpfenig | F16M 11/10 |
| 11,909,349 B2 * | 2/2024 | Wang | F24S 25/70 |
| 11,955,926 B2 * | 4/2024 | Schuknecht | F24S 50/20 |
| 12,028,015 B2 * | 7/2024 | Wang | H10F 10/148 |
| 2008/0236567 A1 * | 10/2008 | Hayden | F24S 25/65 |
| | | | 126/569 |
| 2015/0059827 A1 | 3/2015 | Reed et al. | |
| 2018/0342637 A1 * | 11/2018 | Nishiwaki | H10F 77/219 |
| 2021/0384864 A1 * | 12/2021 | Wang | H02S 30/10 |
| 2022/0077817 A1 * | 3/2022 | Caelers | H02S 40/22 |
| 2022/0107117 A1 * | 4/2022 | Delgado-Nanez | F24S 30/425 |
| 2023/0072681 A1 * | 3/2023 | Morankar | H02S 20/32 |
| 2023/0221043 A1 * | 7/2023 | Gracia Inglés | F24S 30/425 |
| | | | 403/24 |
| 2023/0402963 A1 * | 12/2023 | Yadlapalli | H02S 30/10 |
| 2024/0113652 A1 * | 4/2024 | Yang | H02S 20/32 |
| 2024/0372505 A1 * | 11/2024 | Kresse | F24S 30/452 |

(Continued)

FOREIGN PATENT DOCUMENTS

| | | |
|---|---|---|
| CN | 206235046 U | 6/2017 |
| CN | 214480426 U | 10/2021 |
| CN | 113815109 A | 12/2021 |

(Continued)

OTHER PUBLICATIONS

Coiled Line Pipe; Advanced Coating Technology—Forum Energy Technologies, Inc.; 2 pages; Retrieved from the Internet: https://f-e-t.com/global-tubing/coiled-line-pipe/advanced-coating-technology/.

(Continued)

*Primary Examiner* — Patrick D Hawn
(74) *Attorney, Agent, or Firm* — Patterson + Sheridan, LLP

(57) ABSTRACT

A renewable energy production system includes a plurality of solar panels and a torque tube. The torque tube has an exterior shape defined by an arcuate surface and a flat surface connected to the arcuate surface. The plurality of solar panels are coupled to the flat surface. A plurality of support columns is used to support the torque tube.

18 Claims, 2 Drawing Sheets

(56) References Cited

U.S. PATENT DOCUMENTS

2025/0030378 A1* 1/2025 Yang .................. H02S 20/32
2025/0088141 A1* 3/2025 Mapati ................ H02S 20/32

FOREIGN PATENT DOCUMENTS

| | | | | |
|---|---|---|---|---|
| CN | 109889154 B | * | 4/2024 | |
| EP | 3816459 B1 | | 7/2023 | |
| ES | 2958759 T3 | * | 2/2024 | ............ F16B 7/0406 |
| WO | WO-2014155910 A1 | * | 10/2014 | .............. F24S 25/33 |
| WO | 2022076449 A1 | | 4/2022 | |
| WO | WO-2022227272 A1 | * | 11/2022 | |
| WO | WO-2023218486 A1 | * | 11/2023 | |
| WO | 2023231470 A1 | | 12/2023 | |

OTHER PUBLICATIONS

PCT International Search Report and Written Opinion dated Jul. 23, 2025, for International Application No. PCT/US2025/024027.

* cited by examiner

TORQUE TUBE FOR A RENEWABLE ENERGY SYSTEM

FIELD

Embodiments of the present disclosure generally relate to torque tubes for supporting solar panels.

BACKGROUND

Many renewable energy systems include rows of solar panels to produce renewable energy. Typically, each row includes several panels mounted on a single torque tube. The torque tubes are long so that they can extend along the entire row of panels. The torque tube is supported on several columns spaced along the length of the torque tube. A bearing couples the torque tube to the columns to allow rotation of the torque tube relative to the columns.

These energy systems often use a solar tracking system to move the panels relative to the earth to maximize the production of solar energy. The solar tracking system includes a drive mechanism for rotating the torque tube and the panels. The drive system rotates the torque tube in a manner that keeps the panels perpendicular to the sun.

The torque tube must be able to withstand the torque applied to rotate the row of solar panels. The ability to withstand high torque is especially important due to its length. Additionally, the torque tube must withstand the torque generated by the wind acting on the solar panels. There is, therefore, a need for an improved torque tube capable of withstanding high torque.

SUMMARY

In one embodiment, a renewable energy system includes a plurality of solar panels and a torque tube. The torque tube has an exterior shape defined by an arcuate surface and a flat surface connected to the arcuate surface. The plurality of solar panels are coupled to the flat surface. A plurality of support columns is used to support the torque tube.

In another embodiment, a torque tube is provided to rotate a solar panel. The torque tube include an elongated body having a bore extending therethrough. The body has an exterior shape defined by an arcuate surface and a flat surface connected to the arcuate surface. The flat surface is configured to engage the solar panel.

BRIEF DESCRIPTION OF THE DRAWINGS

Implementations of the present disclosure, briefly summarized above and discussed in greater detail below, can be understood by reference to the illustrative implementations of the disclosure depicted in the appended drawings. It is to be noted, however, that the appended drawings illustrate only typical implementations of this disclosure and are therefore not to be considered limiting of its scope, for the disclosure may admit to other equally effective implementations

DETAILED DESCRIPTION

This disclosure describes improvements for a torque tube for supporting a plurality of solar panels in a renewable energy production system. The torque tube has a unique shape that advantageously provides improved stiffness and shear stress over a square tube. In one example, the torque tube has an exterior shape defined by an arcuate surface connected to flat surface.

Figure 1:
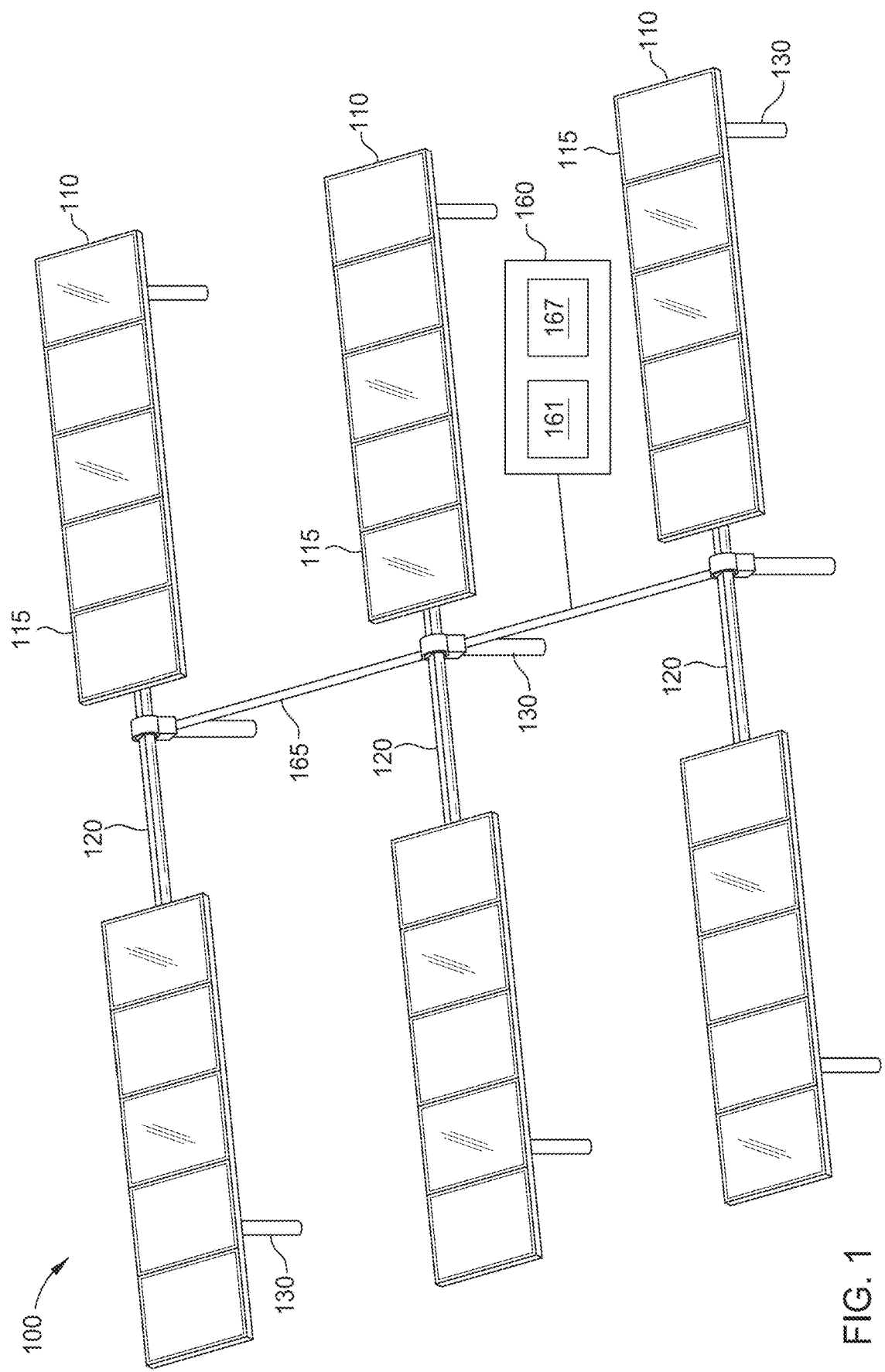
FIG. 1 illustrates a renewable energy system according to some embodiments.

FIG. 1 illustrates an exemplary embodiment of a renewable energy system 100 having several rows 110 of solar panels 115. FIG. 1 shows three rows 110 of solar panels 115, but may include any suitable number of rows of solar panels 115, such as from 2 to 25 rows. Each row 110 may include any suitable number of solar panels 115. As used herein, the solar panels 115 include solar thermal panels, solar photovoltaic panels, or other known solar panels for producing renewable energy.

The solar panels 115 in each row 110 are mounted on a torque tube 120. In this example, the torque tubes 120 extend in the north to south direction. The torque tubes 120 may be substantially aligned in parallel to each other. Each torque tube 120 may be made up of one or more torque tube sections connected to each other. The torque tube sections may be welded to each other. In some embodiments, the torque tube sections have a length from 30 ft to 70 ft. In some examples, the torque tubes 120 may have a length from 50 ft. to 350 ft. The solar panels 115 can be mounted to the torque tube 120 using any suitable mounting mechanisms. In the example shown in FIG. 2, the solar panels 115 are attached to the torque tube 120 using a clamp 140. The clamp 140 is disposed around the exterior of the torque tube 120, and the ends of the clamp 140 are coupled to the solar panel 115. In this example, the clamp 140 is attached to the frame 117 of the solar panel 115 using a connector 142, such as a bolt, a screw, or adhesives. In some examples, the clamp 140 can be attached to any suitable portion of the solar panel 115.

Figure 3:
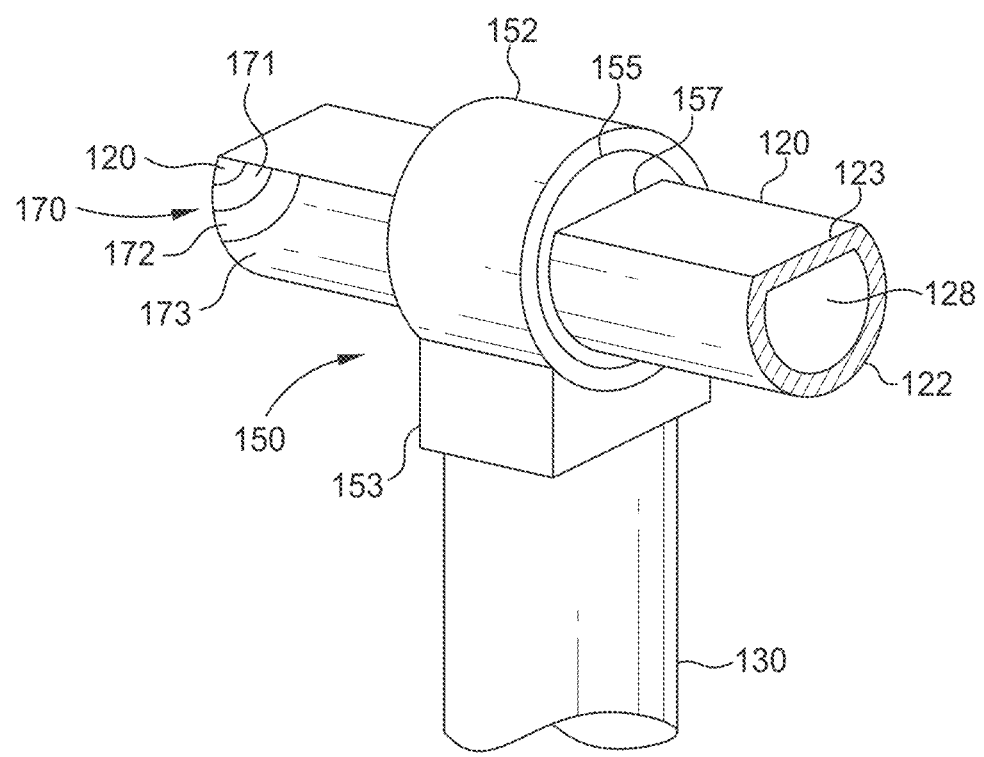
FIG. 3 is a partial, cross-sectional view of a torque tube mounted to a support column in FIG. 1.

The torque tubes 120 are supported by a plurality of support columns 130, as seen in FIGS. 1 and 3. The support columns 130 are spaced apart along the length of the torque tubes 120. The support columns 130 can be installed in the ground in a vertical orientation. The support columns 130 may be installed directly into the ground or in a concrete foundation. The support columns 130 can be hollow or solid, and made from steel or any other suitable material.

The torque tubes 120 are coupled to the support columns 130 using a bearing assembly 150. As shown in FIG. 3, the bearing assembly 150 includes a housing 152, a bearing 155 disposed in the bearing housing 155, and an attachment portion 153. The attachment portion 153 can be connected to the housing 152 or integral with the housing 152. The housing 152 attaches to the support column 130 using the attachment portion 153. In this example, the attachment portion 153 is disposed over the top of the support column 130. In some examples, the attachment portion 153 may be disposed inside the support column 130. The attachment portion 153 may secured to the support column 130 using a weld, or a suitable connector such as bolt, screw, or adhesives.

The bearing 155 is disposed in a cavity of the housing 155 and is rotatable relative to the housing 155. The bearing 155 can have a tubular shape, a ball shape, or any suitable shape for rotatably coupling the torque tube 120 to the support column 130. The bearing 155 includes a bore 157 for receiving the torque tube 120. The bore 157 has a cross-sectional shape complementary to the cross-sectional shape of the torque tube 120. As shown in FIG. 3 and discussed in more detail below, the bore 157 and the torque tube 120 have a cross-sectional shape formed by an arc and a line connected to the ends of the arc, such as a major segment of a circle.

The bearing 155 can be made from metal, polymer, or any suitable bearing material. In some embodiments, the bearing 155 may be any bearing configured to facilitate rotation of the torque tube 120 relative to the support columns 130.

A drive mechanism 160 is configured to rotate the torque tubes 120. Referring to FIG. 1, a drive shaft 165 is coupled to all of the torque tubes 120. In this example, the drive shaft 165 is aligned in a substantially perpendicular orientation relative to the torque tubes 120. The drive shaft 165 may be coupled to the torque tubes 120 using a gear or other coupling mechanism that can cause rotational movement of the torque tubes 120. The drive mechanism 160 includes a drive motor 161 for moving the drive shaft 165 relative to the torque tubes 120. In one example, the drive motor 161 moves the draft shaft 165 linearly, which causes the torque tubes 120 to rotate. In another example, the drive motor 161 rotates the drive shaft 165, which cause the torque tubes 120 to rotate. Rotation of the torque tubes 120 causes the solar panels 115 to rotate, thereby maintaining substantial exposure to the sun as the earth moves. It is contemplated any drive mechanism suitable for causing rotation of the torque tube 120 known to a person of ordinary skill in the art may be utilized.

Referring back to FIG. 3, the torque tube 120 has a novel cross-sectional shape for supporting the plurality of solar panels 115. In some embodiments, the torque tube 120 includes an elongated body having a cross-sectional shape defined by an arc and a line connected to the ends of the arc. As shown, the torque tube 120 has a cross-section in the shape of a major segment of a circle; that is, the shape is defined by a circular arc connected by a chord. FIG. 3 shows the torque tube 120 having an exterior shape formed by a round surface 122 interrupted by a flat surface 123. In some examples, the length of the circular arc is at least half the circumference of a circle formed by the radius of the circular arc. In some examples, the length of the arc is from 0.5× to 0.9× or from 0.6× to 0.85× the circumference of a circle having the same radius as the circular arc. In some embodiments, the cross-sectional shape is defined by an elliptical arc connected by a line. If the torque tube 120 has an elliptical arc, then the length of the elliptical arc can be from 0.5× to 0.9× or from 0.6× to 0.85× the circumference of an ellipse having the same foci as the elliptical arc. In one example, the arcuate surface of the torque tube 120 is at least half of the size of a corresponding circle or ellipse. In some examples, the torque tube 120 has a diameter from 1 inch to 8 inches or from 2 inches to 5 inches. In some embodiments, the line connecting the ends of the arc has a length from 0.25× to 1× the length of the diameter or from 0.4× to 0.9× the length of the diameter of the circle (or the minor axis or major axis of the ellipse). In some examples, the intersection between the round surface 122 and the flat surface 123 has an arcuate shape.

In one embodiment, the torque tube 120 includes a tube bore 128 extending therethrough. The tube bore 128 can have a cross-sectional shape that is the same as, but smaller, than the exterior shape. The torque tube 120 has a wall thickness in the range from about 0.03 inches to 0.5 inches or from 0.05 inches to 0.35 inches. In one example, the torque tube has uniform wall thickness. The torque tube 120 can be made from a metal material such as steel alloy or aluminum. In some examples, the torque tube 120 can be made from a composite material such as fiberglass or carbon fiber. In some examples, the torque tube 120 has a steel yield in a range from 50 ksi to 150 ksi.

In some embodiments, the torque tube 120 is formed using a rolling process. For example, a flat sheet of metal is drawn through rollers that bend and form the arcuate exterior surface 122 and the flat surface 123. The edges of the flat sheet are welded together to formed torque tube 120. In some embodiments, the torque tube 120 is provided with a coating or finishing process to improve corrosion resistance, abrasion resistance, protection from UV radiation, or combinations thereof. In one embodiment, the torque tube 120 includes a coating 170 disposed on it exterior surface. For example, an epoxy-polyolefin coating can be disposed on its exterior surface. In some examples, the coating 170 on the torque tube 120 comprises a three layer coating system. The coating 170 includes a first (inner) layer 171 comprising a fusion bonded epoxy coating disposed on the exterior surface of the torque tube 120. A second (middle) layer 172 comprising an adhesive copolymer is disposed on the first layer 171. A third (outer) layer 173 comprising an extruded polyolefin coating is disposed over the second layer 172. The second layer 172 may facilitate bonding of the first layer 171 to the third layer 173. Examples of the polyolefin include polyethylene or polypropylene. In some examples, the thickness of the three layers of coating 171-173 is from 40 mils to 150 mils or from 50 mils to 125 mils. Although a three layer coating system is disclosed, it is contemplated the coaling 170 can include one or more layers, such as a single polyolefin coating. In some embodiments, an abrasion resistant coating is disposed over the outermost coating (e.g., third layer 173) of the torque tube 120 to protect the outermost coating. In one example, the abrasion resistant coating is a thermoset epoxy. In another example, the coating on the torque tube 120 is zinc.

Figure 2:
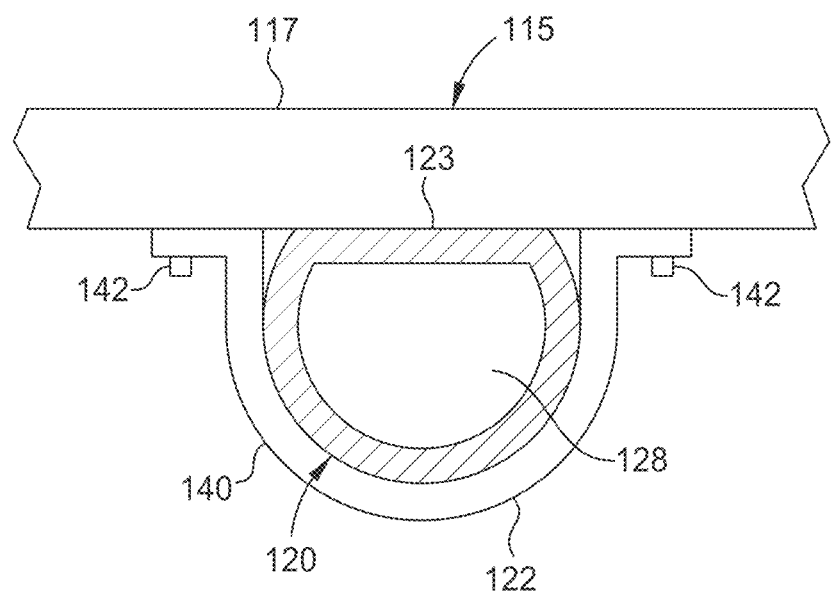
FIG. 2 is a partial, cross-sectional view of a torque tube mounted to a solar panel in FIG. 1.

Referring to FIG. 2, the solar panels 115 are mounted to the flat surface 123 of the torque tube 120. The flat surface 123 engages the solar panels 115, and the clamp 140 engages the arcuate exterior surface 122 of the torque tube 120. It is believed the arcuate exterior surface 122 minimizes the shear stress experienced by the torque tube 120 when torque is applied. In this respect, the torque tube 120 behaves more like a fully cylindrical tube and has a lower shear stress than a square shaped tube. The torque tube 120 is also stiffer than a square shaped tube. Additionally, the exterior flat surface 123 advantageously facilitates attachment of the torque tube 120 to the solar panel 115 and reduces the potential for relative movement between the torque tube 120 and the solar panel 115.

The drive mechanism 160 of the renewable energy system 100 is configured to rotate the solar panels 115 to maximize exposure to the sun. The drive mechanism 160 includes a controller 167 for operating the motor 161 to move the drive shaft 165 and rotate the torque tube 120 so the solar panel 115 tracks the movement of the sun. In some embodiments, the controller 167 is provided with a solar tracking algorithm as is known in the art. The controller 167 can operate one or more drive shafts, each of which is connected to a plurality of rows of solar panels. The controller 167 can communicate with the drive mechanism of each drive shaft via wired or wireless communication.

The controller 167 disclosed herein includes a central processing unit (CPU), a memory, and support circuits. The controller 167 is configured to operate the drive mechanism to rotate the torque tubes to maximize exposure to the sun. The CPU is a general purpose computer processor configured for use in an industrial setting for monitoring and controlling the drive mechanism, energy production system, and operations related thereto. The memory described herein may include random access memory, read only memory, floppy or hard disk drive, or other suitable forms of digital storage, local or remote. The support circuits are conventionally coupled to the CPU and comprise cache, clock circuits, input/output subsystems, power supplies, and the like, and combinations thereof. Software instructions (program) and data can be coded and stored within the memory for instructing a processor within the CPU. A software program (or computer instructions) readable by CPU in the controller 167 determines operation of the drive mechanism and the energy production system. Preferably, the program, which is readable by CPU in the controller 167, includes code, which when executed by the processor (CPU), takes action relating to monitoring and operating the drive mechanism and the energy production system described herein. The program will include instructions that are used to control the various hardware and electrical components within the energy production system and the drive mechanism to perform the various tasks used to implement the operational schemes described herein.

While the disclosure has been shown in only one of its forms, it should be apparent that various modifications are possible. For example, the exterior could have a different number of flat sides, such as ten sides.

The invention claimed is:

1. A renewable energy production system, comprising:
    a plurality of solar panels;
    a torque tube having an exterior shape defined by:
        an arcuate surface; and
        a flat surface connected to the arcuate surface, wherein the plurality of solar panels are coupled to the flat surface, and wherein an epoxy-polyolefin coating is disposed on the torque tube; and
    a plurality of support columns supporting the torque tube.

2. The system of claim 1, wherein the torque tube includes a tube bore extending therethrough.

3. The system of claim 1, wherein the flat surface has a length in a range from 0.25× to 1× of a diameter defining the arcuate surface.

4. The system of claim 1, wherein the arcuate surface is defined by a radius, and the arcuate surface has length in a range from 0.5× to 0.9× of a circumference of a circle defined by the radius.

5. The system of claim 1, further comprising a bearing assembly coupling the torque tube to the plurality of support columns.

6. The system of claim 5, wherein the bearing assembly includes a bearing having a bore for receiving the torque tube, wherein the bore of the bearing has a shape complementary to the exterior shape of the torque tube.

7. The system of claim 1, wherein the system includes a plurality of torque tubes, and further comprises a drive shaft configured to rotate the plurality of torque tubes and a motor for moving the drive shaft.

8. The system of claim 1, further comprising a clamp for connecting the torque tube to the solar panels.

9. The system of claim 8, wherein the clamp includes an arcuate portion complementary to the arcuate surface of the torque tube.

10. The system of claim 1, wherein the torque tube has a thickness in a range from 0.03 inches to 0.5 inches.

11. A torque tube for rotating a solar panel, comprising:
    an elongated body having a bore extending therethrough, wherein an epoxy-polyolefin coating is disposed on the elongated body, the elongated body having an exterior shape defined by:
        an arcuate surface; and
        a flat surface connected to the arcuate surface, wherein the flat surface is configured to engage the solar panel.

12. The torque tube of claim 11, wherein the flat surface has a length in a range from 0.25× to 1× of a diameter defining the arcuate surface.

13. The torque tube of claim 11, wherein the arcuate surface is defined by a radius, and the arcuate surface has length in a range from 0.5× to 0.9× of a circumference of a circle defined by the radius.

14. The torque tube of claim 11, wherein the coating comprises:
    a first layer comprising a fusion bonded epoxy coating disposed on the flat surface;
    a second layer comprising an adhesive copolymer disposed on the first layer; and
    a third layer comprising an extruded polyolefin coating disposed over the second layer.

15. The torque tube of claim 11, wherein the torque tube is formed using a rolling process.

16. The torque tube of claim 15, wherein the torque tube comprises a metal sheet having a first edge welded to a second edge.

17. The torque tube of claim 16, wherein the torque tube has a thickness in a range from 0.03 inches to 0.5 inches.

18. The torque tube of claim 11, wherein the arcuate surface is defined by a circle or an ellipse.

\* \* \* \* \*